Aug. 11, 1925.

H. E. JENNISON

HORSE COLLAR

Filed Sept. 5, 1922

H. E. Jennison, Inventor

Knight Bros.

Attorney

Aug. 11, 1925.  
H. E. JENNISON  
HORSE COLLAR  
Filed Sept. 5, 1922  
1,548,887  
7 Sheets-Sheet 4

Aug. 11, 1925.                H. E. JENNISON                1,548,887
                                HORSE COLLAR
                            Filed Sept. 5, 1922           7 Sheets-Sheet 6

Patented Aug. 11, 1925.

1,548,887

UNITED STATES PATENT OFFICE.

HERBERT E. JENNISON, OF FITCHBURG, MASSACHUSETTS.

HORSE COLLAR.

Application filed September 5, 1922. Serial No. 586,232.

*To all whom it may concern:*

Be it known that I, HERBERT E. JENNISON, a citizen of the United States, and a resident of Fitchburg, in the county of Worcester and State of Massachusetts, have invented new and useful Improvements in Horse Collars, of which the following is a specification.

My invention relates to horse collars and more particularly to horse collars capable of adjustment transversely and longitudinally whereby the collar may be properly fitted to the horse, mule or the like.

An object of my invention is to provide an adjustable horse collar which in the first instance may be easily and quickly adjusted to fit horses of various sizes, this adjustment being accomplished usually without removing the collar from the horse therefore rendering a perfect fit more certain.

Another object of my invention is to provide a horse collar which although adjustable to meet the various needs of a collar of this type is so constructed that the same is rendered strong and durable whereby it may be successfully commercially exploited.

The preferred embodiment of my invention relates mainly to metallic horse collars coated with zinc whereby in use an oxide is formed by the contact of the collar with the horse, which oxide has a medicinal curative effect, thus tending to heal sores which might develop on the horse's neck.

A still further object of my invention is to provide means whereby the desired adjustability of a horse collar may be accomplished either in connection with an all metal collar, a leather collar or a padded metallic collar, thus rendering the objects of this invention obtainable in any of the known types of collars now universally employed.

The novel combination, construction and arrangement of parts wherein the objects of this invention are efficiently accomplished will be made more apparent as the description proceeds, especially when considered in connection with the accompanying drawings wherein:

Referring now more particularly to the drawings wherein like reference characters indicate like parts the first and preferred embodiment of the invention will be described. This preferred embodiment of the invention is illustrated in Figs. 1 to 10 inclusive. In these drawings it will be noted that a metallic collar is illustrated comprising side sections 10 which are preferably substantially U-shaped in cross section, each side of the collar being preferably shaped as at 11 to fit the scapulars of the horse. Each collar section 10 is provided with a draft spring 12 disposed inside the collar adjacent the trace hook 13. These draft springs consist of sheets of spring metal also substantially U-shaped in cross section and positioned adjacent the trace hooks as mentioned so as to provide a resiliency at these points of the collar to prevent dead pressure on the horse in drawing the load. Each collar section is also provided adjacent the buckle point with a spiral spring 14 which surrounds a bolt 15, thus properly positioning these spiral springs. In practice, it has been found that metal collars usually break at the buckle point because of the rigid connection of the sides of the collar at this point but by so positioning these spiral springs 14, the strains to which the collar is subjected is taken up by the springs thereby dissipating the shock and preventing the collar from breaking.

Figure 3:
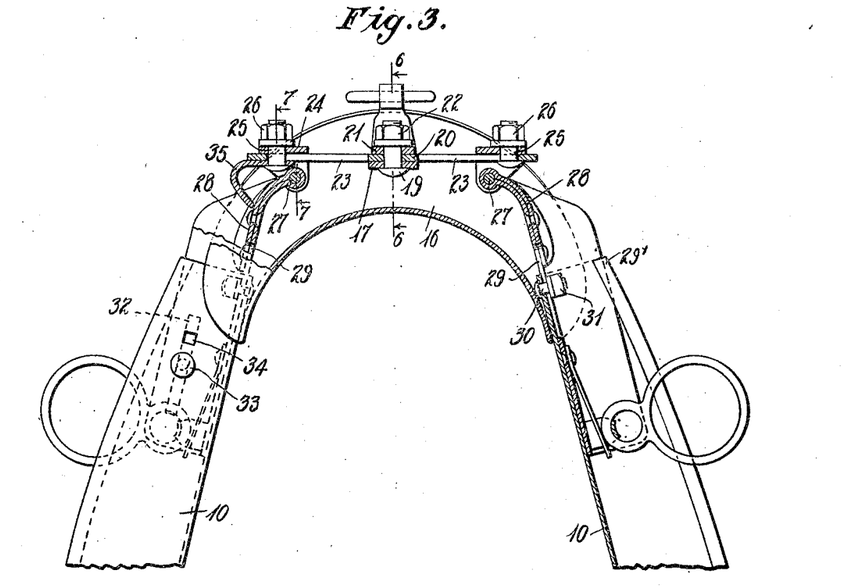
Fig. 3 is an enlarged fragmentary view, partly in section, of the upper portion of the collar.
Figure 4:
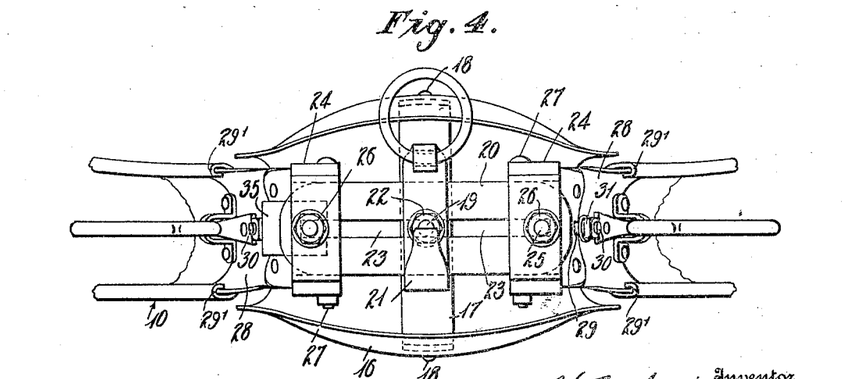
Fig. 4 is a top plan of the structure shown in Fig. 3.
Figure 5:
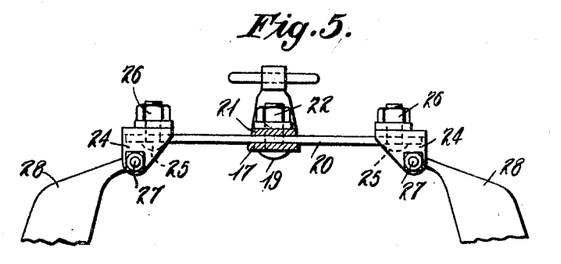
Fig. 5 is a fragmentary view of the top connecting member showing the connecting members reversed for the purpose of adjustment.
Figure 6:
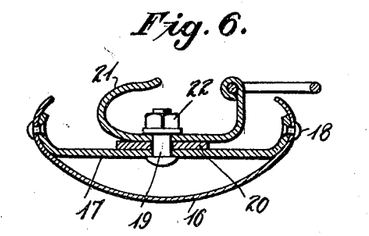
Fig. 6 is a sectional view taken on the plane indicated by line 6—6 in Fig. 3.
Figure 7:
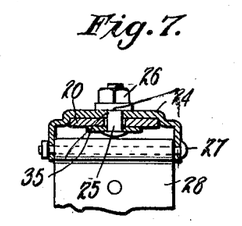
Fig. 7 is a fragmentary sectional view taken on the plane indicated by line 7—7 in Fig. 3.

Cooperating with the collar sections 10 is a metal neck pad 16 suitably shaped to properly fit the neck of the horse. In practice it is proposed to make these neck pads 16 of various sizes, ranging from the smallest size normally used to a size necessary to fit the largest size of horse. Thus ordinarily in fitting a collar the size of neck pad 16 will be first ascertained and then this pad connected to the upper ends of the collar sections 10 in a manner to be later described. The proper size of neck pad will be determined preferably by the use of templets which will be placed on the horse's neck until the proper size is found whereupon a neck pad 16 corresponding to a number on the templet will be obtained and this neck pad secured to the upper ends of the collar sections in the following manner:

Each neck pad is preferably provided with a transverse brace or support 17, which is provided with upturned ends which are secured as at 18 to the neck pad 16 (see particularly Figs. 3 and 6). Projecting upwardly from the brace or support 17 is a bolt 19 which in turn is adapted to pass through a connecting member 20 and also through the usual pad hook 21, the pad 16 being then held in place by a nut 22 threaded onto the upper end of the bolt 19. In this way the pad 16 is removably secured to the connecting member 20.

The connecting member 20 forms part of a hinged connection and is furthermore adapted to provide for an adjustment and for this purpose the connecting member 20 is formed with a pair of longitudinally extending slots 23 which extend from a point adjacent the center of the same to points adjacent the end. Offset hinge clips 24 are secured to the connecting member 20 by means of bolts 25, nuts 26 threaded onto the ends of the bolts 25 being provided for clamping the clips 24 in any of their adjusted positions. The bolts 25 travel in the slots 23 whereby they may be adjusted toward and from the center of the connecting member 20.

Pivotally secured to the hinge clips 24 as at 27 are hinge members 28 which are preferably U-shaped in cross section and adapted to telescope into the open upper ends of the collar sections 10. The edges of these hinged members 28 preferably slide in grooves formed by bending the edges of the collar sections 10 as illustrated clearly at 29' in Figs. 3 and 4. As mentioned hereinbefore, the hinge clips 24 have offset portions and the connection 27 between the hinge members 28 and these hinge clips is provided at this point. From an examination of Figs. 3 and 4 it will be seen that the distance between the points of connection 27 may be varied to some extent by reversing the position of the hinge clips 24, these offset portions in Fig. 3 being illustrated as disposed toward the center of the connecting member 20 while in Fig. 5 the clips 24 are disposed so that their offset portions are arranged away from the center of the connecting member 20.

As mentioned hereinbefore the hinge members 28 telescope into the open ends of the collar sections 10 and for adjustably connecting each hinge member 28 to its associated collar section 10 the following arrangement is provided.

The hinge member 28 is provided centrally thereof with a longitudinally extending slot 29 while cooperating with this slot is a bolt 30 which is adapted to extend therethrough and which is provided with a nut 31 whereby the parts may be adjusted and the clamping nut 31 tightened to hold the parts in place. Each hinge member 28 is further provided with a longitudinally extending slot 32 arranged in one side thereof and adapted to cooperate with a bolt 33 which is also provided with a clamping nut. In order to increase the limit of adjustment the collar sections 10 may be provided with several apertures 34 through which the bolt 33 is adapted to be inserted. Obviously therefore when it is desired to adjust the connection between each hinged member 28 and its associated collar section the clamping nuts of the bolts 30 and 33 are loosened, the parts adjusted to the desired position and the nuts thereafter again tightened. By placing the binder posts or bolts 30 and 33 at right angles to one another a more rigid connection is secured so that liability of the parts becoming separated at this point is practically negligible.

Figure 1:
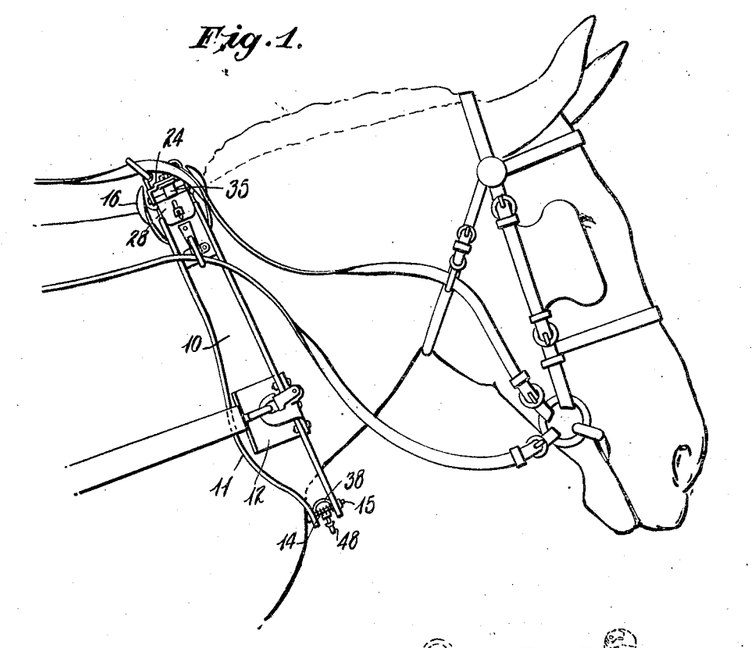
Fig. 1 is a perspective view of a portion of a horse with a collar constructed in accordance with my invention applied thereto.
Figure 2:
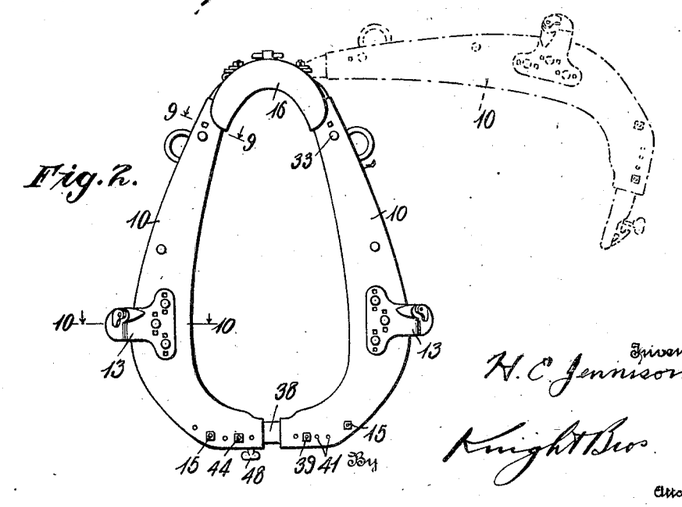
Fig. 2 is a front elevation of the collar, one side of the collar being shown open in dotted lines.

Obviously when the collar is disengaged at its lower end either or both of the sections 10 could be swung about their hinged connections 27 as indicated in dotted lines in Fig. 2. However in horse collar constructions of this type it is found desirable to cause the pad 16 to swing with one or the other of the collar sections 10 or on the other hand to be secured to one side section, thus permitting only one collar section 10 to be moved relatively to the pad 16. This is for the purpose of preventing injury to the neck of the horse when the collar is placed thereon inasmuch as otherwise there would be danger of catching the neck of the horse between the pad and the collar sections 10. For holding the pad 16 immovable relative to one of the collar sections 10 there is provided an angular lug 35 which is preferably carried by one of the bolts 25 (see particularly Fig. 3). This lug is adapted to bear against the hinge member 28, thus preventing a relative swinging of the parts about the adjacent hinge connection 27.

Figure 8:
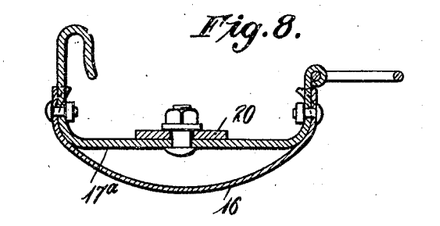
Fig. 8 is a view similar to Fig. 6, showing a slightly modified form of construction.
Figure 9:
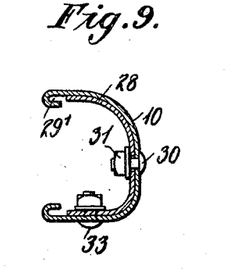
Fig. 9 is a section indicated by line 9—9 in Fig. 2.
Figure 10:
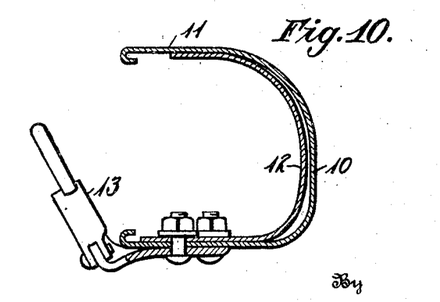
Fig. 10 is a section taken on the plane indicated by line 10—10 in Fig. 2.

In Fig. 8 there is illustrated a slight modification of the structure illustrated in Fig. 6, that is, the brace or supporting member 17ª which corresponds to the supporting member 17 in Fig. 6 carries the pad hook thus eliminating the necessity of providing a separate pad hook 21 as is illustrated in Fig. 6. In all other respects this structure is identical with the preferred embodiment.

By referring now more particularly to Figs. 11 to 14 inclusive the buckle for connecting the lower ends of the collar sections 10 will be described. The buckle consists of a member 36 pivoted as at 37 to a U-shaped slide 38. The slide is adapted to be adjustably connected to one of the collar sections 10, this adjustment being accomplished by means of a bolt 39 which passes through a slot 40 in the slide member 38, the collar section 10 being formed preferably with a plurality of apertures 41, (see Fig. 2) through which the bolt 39 is also adapted to pass. Obviously the slide 38 telescopes into both open ends of the collar sections 10, the edge of this slide member running in grooves formed by bending the edges of the collar sections 10 as indicated at 42 (see Figs. 13 and 14).

Figure 11:
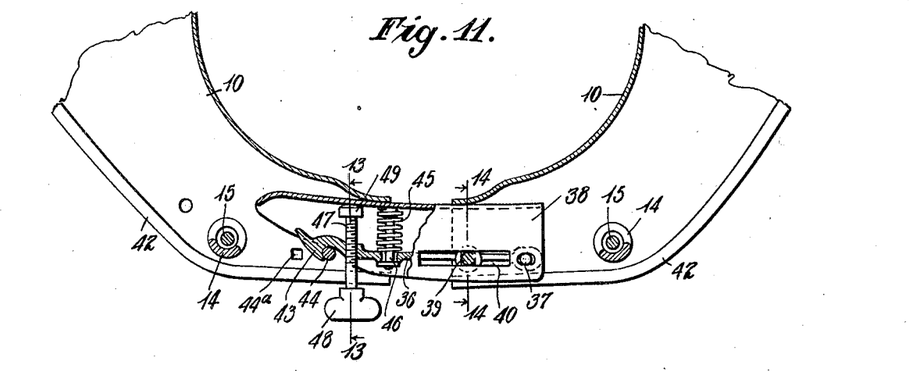
Fig. 11 is an enlarged sectional view partly in elevation, of the buckle connection at the bottom of the collar.
Figure 12:
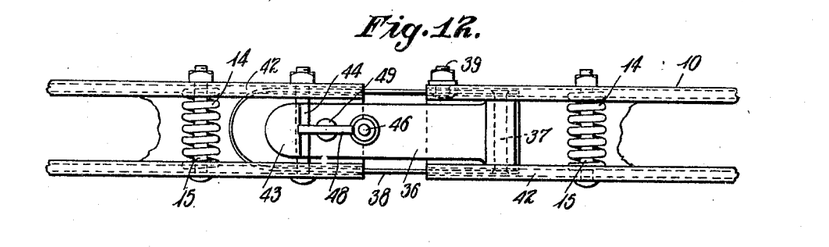
Fig. 12 is a plan view of the structure illustrated in Fig. 11.
Figure 13:
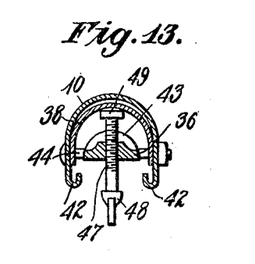
Fig. 13 is a section taken on the plane indicated by line 13—13 in Fig. 11.
Figure 14:
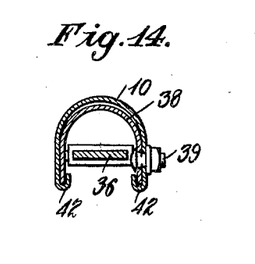
Fig. 14 is a sectional view taken on the plane indicated by line 14—14 in Fig. 11.
Figures 15, 16:
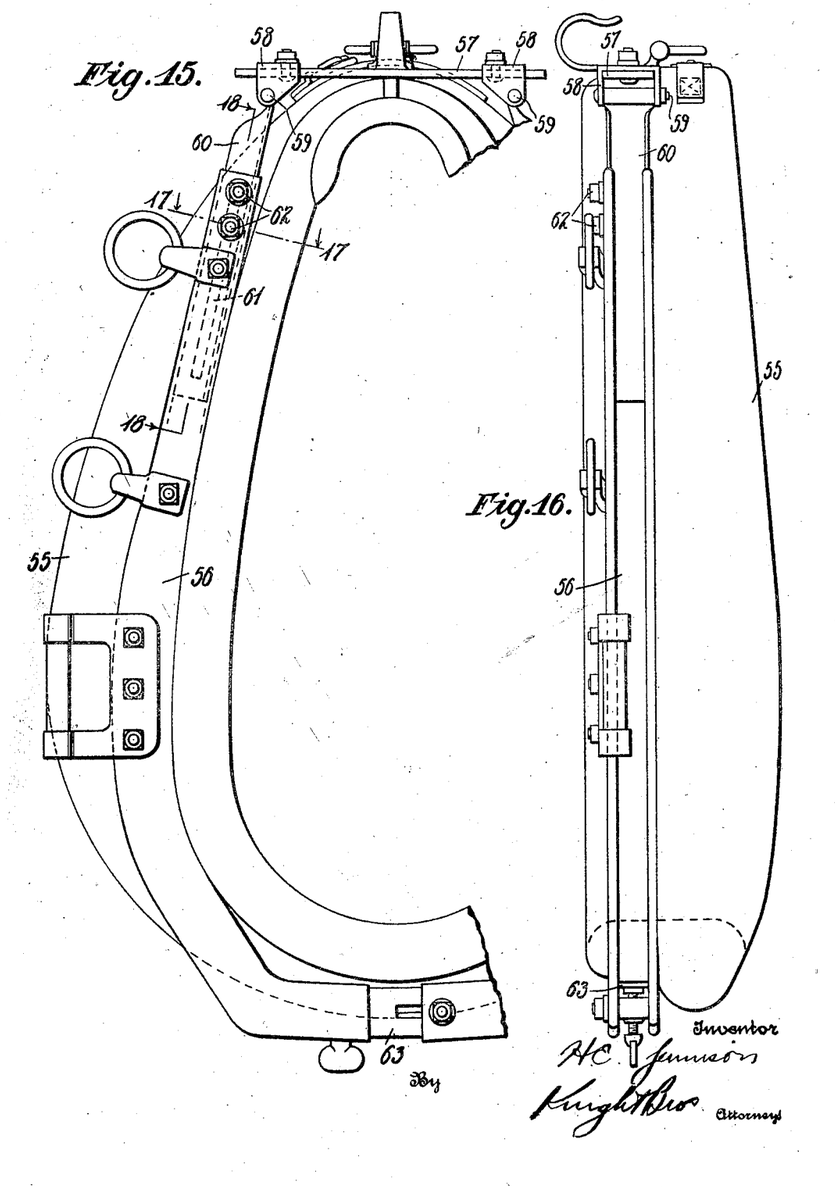
Fig. 15 is a fragmentary front elevation of a modified form of construction showing an adjustable hame used in connection with a leather collar.
Fig. 16 is a side elevation of the structure illustrated in Fig. 15.
Figure 17:
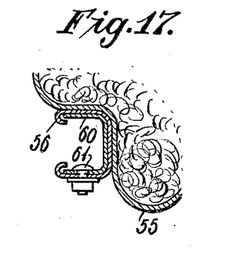
Fig. 17 is a fragmentary sectional view taken on line 17—17 in Fig. 15.
Figure 18:
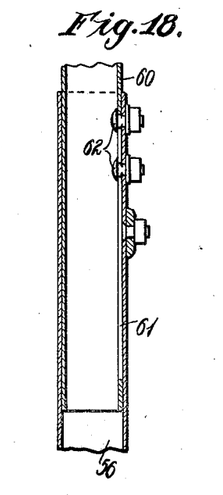
Fig. 18 is a fragmentary sectional view taken on the plane indicated by line 18—18 in Fig. 15.
Figures 19, 20:
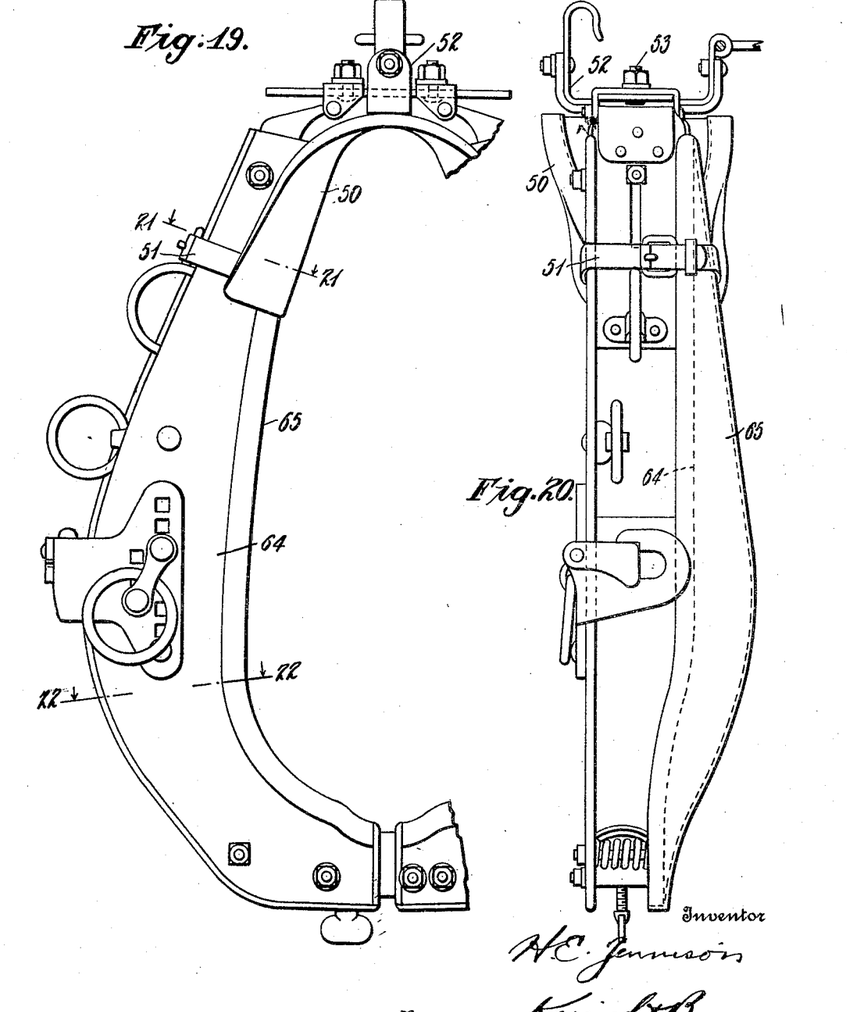
Fig. 19 is a fragmentary front elevation of a second modification, showing a padded metallic collar.
Fig. 20 is a side elevation of the structure illustrated in Fig. 19.
Figure 21:
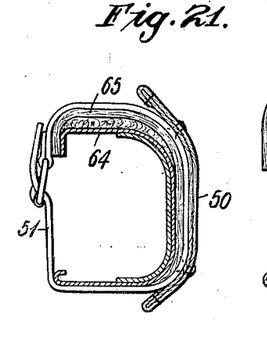
Fig. 21 is a sectional view taken on the plane indicated by line 21—21 in Fig. 19.
Figure 22:
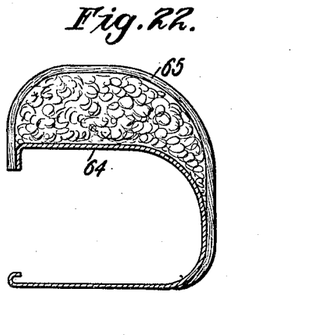
Fig. 22 is a sectional view taken on the plane indicated by line 22—22 in Fig. 19.

The member 36 is provided with a hooked end 43 which engages a rod 44 extending transversely of one of the collar sections 10. The position of the rod 44 is variable within certain limits by providing a plurality of pairs of aligned apertures 44ª in the collar section 10 whereupon the bolt 44 may be positioned in any one of the pairs of apertures disposed at spaced intervals from the ends of the collar section. When the parts are in engagement as illustrated in Fig. 11 the collar sections are locked together. For the purpose of maintaining the hooked end 43 of the member 36 in engagement with the rod 44 there is provided a coil spring 45 which bears on the one hand against the slide 38 and on the other hand against the member 36 thereby urging the same in the direction in which the hooked end engages the rod 44. This coil spring 45 surrounds a guide bolt 46 which projects upwardly from the slide 38 and projects loosely through an aperture formed in the member 36. For locking the latch member 36 in operative position there is provided a threaded locking bolt 47 having a thumb portion 48 and a head 49 which engages the slide 38. The locking bolt 47 is threaded through the latch member 36 and obviously when the locking bolt is in the position illustrated in Fig. 11, that is, with the head 49 engaging the slide 38 a movement of the latch member 36 in the direction opposed by the spring 45 is prevented, whereupon accidental disengagement of the latch is prevented and the collar sections are positively fastened together. When it is desired to release the latch member 36 the locking bolt 47 is unscrewed by means of the thumb portion 48 thereby moving the head 49 away from the slide 38 and permitting a movement of the latch member 36 against the action of the spring 45 whereupon the hooked end 43 is disengaged from the rod 44 and the collar sections 10 unfastened.

By adjustably securing the slide 38 to one of the collar sections 10 it is possible to vary the transverse size of the collar. The arrangement of a slot in a slide 38 and a plurality of apertures in one of the collar sections 10 enables adjustment, the limits of which are sufficient in practically all cases. In any of the positions of adjustment the slide 38 is rigidly connected to one of the collar sections 10 and when the hooked end of the member 36 engages the rod 44 of the other collar section and locking bolt 47 is actuated the two collar sections 10 will be firmly locked together.

Figure 23:
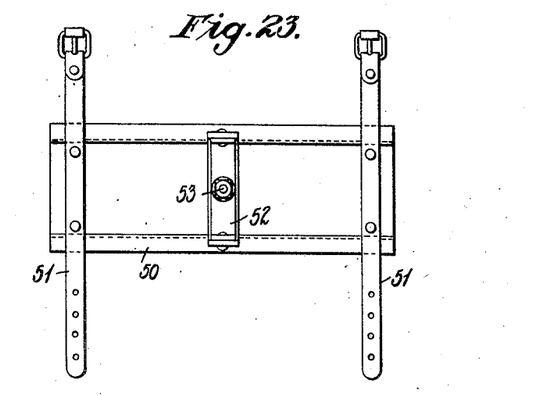
Fig. 23 is a plan view of a leather neck pad used in some of the modified constructions.
Figure 24:
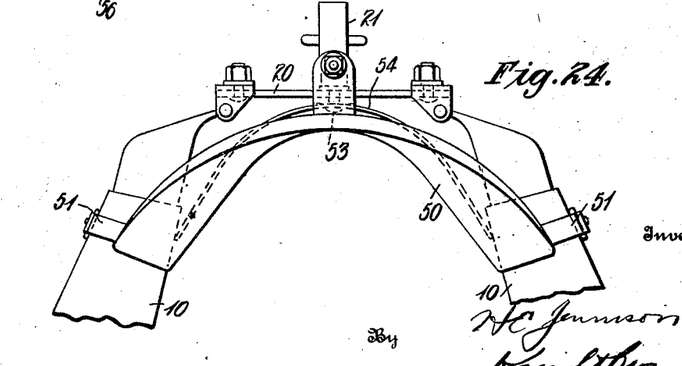
Fig. 24 is a fragmentary front elevation of the collar showing a leather neck pad replacing the metal neck pad.

As mentioned hereinbefore the use of an all metal collar of the type just described contemplates the use of a plurality of metal neck pads 16 which will be made in an assortment of sizes whereby after measuring the neck of the horse at this point a neck pad 16 of the proper size may be secured to the collar sections. However it is ofttimes found desirable to replace the metallic neck pad 16 with a leather neck pad which leather neck pad is capable of adjustment so as to fit the neck of any horse, mule or the like. Obviously in using a leather neck pad the collar may be applied to the horse and adjusted to the proper size, the leather neck pad conforming to the adjustment by reason of its flexibility. By referring to Figs. 23 and 24 this feature of this present invention will be described more particularly.

The leather neck pad 50 is shown as being provided with a pair of straps 51 located at each end thereof while centrally of the pad there is provided a metal clip 52 which is provided with a bolt or binding post 53 extending outwardly therefrom. A flat leaf spring 54 is secured to the clip 52 and extends longitudinally of the pad 50. In applying the leather pad 50 the binding post or bolt 53 thereof is extended upwardly through the connecting member 20 as in the preferred embodiment of this invention and the pad hook 21 is secured in place in the same manner as described with reference to the preferred embodiment. The straps 51 are caused to engage around the collar sections 10 as clearly illustrated in Fig. 24 while the ends of the flat spring 54 bear against the collar sections 10 thus urging the same outwardly so as to maintain the latch member 36 at the bottom of the collar in firm engagement with the rod 44. Obviously this is not absolutely essential although such a spring is desirable and it should be understood that the flat or leaf spring 54 may be omitted if desired. Furthermore the pad hook 21 may be formed integrally with the clip 52 such as suggested in the modification illustrated in Fig. 8. In the preferred embodiment of the invention the engagement of the collar sections 10 with the edges of the metal pad 16 provide sufficient spring pressure to maintain a firm engagement of the buckle member at the bottom of the collar.

By referring to Figs. 15 to 18 inclusive the application of this present invention to a hame will be briefly referred to. The hame is for use in connection with horse and mule collars made of leather or other material and in this present instance a collar 55 of leather or the like is illustrated, which collar is preferably of the usual commercial design now universally employed. The hame consists of a pair of sections 56 similar to the sections 10 of the metal collar, the upper ends of the hame sections 56 being connected in a manner similar to the connection of the collar sections 10 of the preferred embodiment of the invention, a connecting member 57 being provided to which are secured adjustable clips 58 which are pivoted as at 59 to hinge members 60. As in the previous form of the invention the hinge members 60 are secured to the upper ends of the hame sections 56 by a bolt and slot means, the slots 61 in this present instance being formed along one side of each of the hinge members 60, a plurality of bolts 62 extending therethrough and also through apertures formed in the upper ends of the hame sections 56 whereupon the hinge members 60 and hame sections 56 are adjustably but rigidly united. The connection between the hame sections 56 at the bottom thereof is identical with the buckle connection of the preferred embodiment of this invention, this buckle connection being herein indicated by the reference character 63.

From the foregoing it will be immediately apparent that the numerous advantages of this invention may also be obtained by the use of a hame and leather collar or the like. Obviously by adjusting the hame the collar which is in itself flexible will conform to the adjustment made to the hame whereupon leather collars or the like will be caused to properly fit the neck of horses, mules or the like.

By referring more particularly to Figs. 19 to 22 the application of this present invention to a combined metal and leather collar will be described. By this present construction the demand of the trade for a leather collar is met, at the same time providing the durability, resiliency and adjustability of the metal collar.

In this present instance the construction of the adjustable portions of the metal collar are identical with the structure described when referring to the preferred embodiment of this invention. In this present instance a metal collar having sections 64 is illustrated, the leather collar or pad portion being indicated by the reference character 65. Inasmuch as the structure is identical with the first described structure the same will not be referred to in detail. In this present arrangement the leather neck pad 50 is employed so that an entire leather surface engages the body of the horse.

Obviously with a structure such as illustrated, all of the advantages of a leather collar are obtained with the added advantages inherent in a metal collar which include the adjustability whereby the same may be properly fitted to the neck of a horse.

From the foregoing it will be obvious that there is provided by this present invention means for securing a complete and absolute fit of a collar for draft animals such as horses, mules and the like. While in the preferred embodiment of the invention a metallic collar is described and illustrated it will be apparent from the examination of the suggested modifications that the advantages of the invention are clearly obtainable in practically all known types of horse collars. One of the foremost advantages of the invention is the construction and arrangement of the parts wherein the fitting of a horse collar may be accomplished by unskilled persons. In this present instance the collar may be placed upon the neck of the animal and the parts properly adjusted and then secured in their adjusted positions. This is particularly so when the leather neck pad is employed. However, the use of the metal neck pad entails no great amount of skill in fitting the same inasmuch as it is proposed to employ templets corresponding in shape and size to the metal neck pads whereupon the desired size of metal neck pad may be readily ascertained and the same secured to the collar before the collar is placed upon the neck of the animal. Thus in use of any of the forms of collars described herein a complete and proper fit may be obtained with comparative ease and by unskilled persons.

The suggested modifications are indicative of the fact that the details of this invention should not be unnecessarily limited as various changes and modifications in the specific forms illustrated may be resorted to without departing from the spirit and scope of this invention and to this end I reserve the right to make such changes as may come within the purview of the accompanying claims.

Having thus described my invention what I claim is:

1. In a metal horse collar of the class described a pair of side members, a pair of hinge members, means adjustably securing said hinge members to the upper ends of said side members, a slotted connecting member, clips adjustably secured in said slots and pivotally united to said hinge members and an adjustable buckle connection at the lower ends of said side members for releasably uniting said side members.

2. In a metal horse collar of the class described a pair of side members, a pair of hinge members, means adjustably securing said hinge members to the upper ends of said side members, a slotted connecting member, clips adjustably secured in said slots and pivotally united to said hinge members, an adjustable buckle connection at the lower ends of said side members for releasably uniting said side members and a neck pad removably secured to said connecting member.

3. In an adjustable metal horse collar a pair of side members, a pair of hinge members, pin and slot means for adjustably securing said hinge members to the upper ends of said side members, a slotted connecting member, a pair of hinge clips adjustably secured in the slots of said connecting member, said hinge members being pivoted to said hinge clips and a removable neck pad secured to said connecting member, said neck pad being selected in accordance with the adjusted size of said collar.

4. In an adjustable metal horse collar a pair of side members, a pair of hinge members telescoping into the upper ends of said side members, right-angularly disposed binding post and slot means for adjustably securing said hinge members to said side members, a connecting member, reversible offset clips adjustably secured to said connecting member, said hinge members being pivoted to the offset portion of said clips, means carried by one of said clips and engaging the adjacent hinge member for preventing a relative swinging movement of said hinge member in one direction and means for removably mounting a neck pad on said connecting member.

5. In a metal horse collar of the class described a pair of side members, said side members being substantially U-shaped in cross section, harness connections secured to said side members, a buckle connection arranged at the bottom thereof and coil springs spanning said U-shaped members adjacent said buckle connection for resiliently connecting the sides of the U-shaped members.

HERBERT E. JENNISON.